Jan. 29, 1929.

R. V. L. HARTLEY 1,700,528

DIRECTION FINDING

Filed Aug. 27, 1923

Inventor:
Ralph V. L. Hartley,
by Joel C. R. Palmer  Atty

Patented Jan. 29, 1929.

1,700,528

UNITED STATES PATENT OFFICE.

RALPH V. L. HARTLEY, OF SOUTH ORANGE, NEW JERSEY, ASSIGNOR TO WESTERN ELECTRIC COMPANY, INCORPORATED, OF NEW YORK, N. Y., A CORPORATION OF NEW YORK.

DIRECTION FINDING.

Application filed August 27, 1923. Serial No. 659,550.

This invention relates to transmitting and receiving energy waves, such for instance as sound waves or Hertzian waves, and has for an object to increase the accuracy with which the direction of a wave receiving station with respect to the source of the waves can be ascertained.

In accordance with the invention the direction in which the waves emanate from the source or transmitting station is found at the receiving station by some known or suitable method, the direction in which the waves are traveling as they reach the receiving station is also determined by some known or suitable method and these two directions are compared, any difference between the two observations serving as an indication that the waves have undergone bending or change in direction of propagation during the transmission, and moreover, such difference, where it is not large, serving to indicate strong probability that the true direction of the receiving station from the source lies somewhere between the two observed directions.

Figure 1:
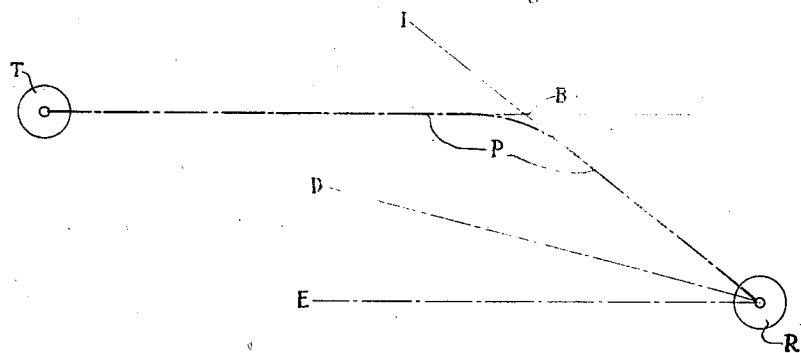
Figure 2:
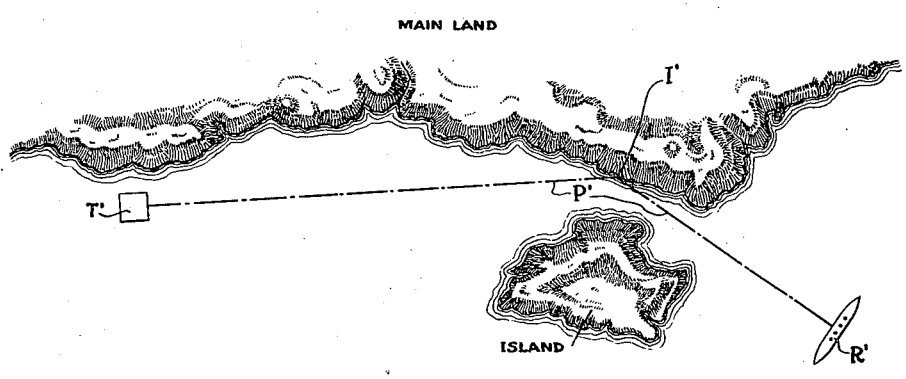

Other objects of the invention will appear from the following detailed description and claims taken in connection with the accompanying drawings wherein Fig. 1 shows a wave transmitting station and a wave receiving station diagrammatically to facilitate explanation of the invention; and Fig. 2 is a diagrammatic illustration of an application of the invention to sound signaling.

Methods of direction finding heretofore proposed fall into two classes. In the first class the direction in which the wave reaches the receiving station is determined locally, as, for instance, by a binaural receiver in the case of sound or a loop antenna in the case of radio. Examples of this class are disclosed in the following United States patents: Taylor 939,349, November 9, 1909, sound-locating device; Fessenden, 1,348,856, August 10, 1920, apparatus for directive signaling; and Knoll, 1,394,026, October 18, 1921, radio system. In the other or second class, the sending station is made to send out an unsymmetrical wave of such a nature that the listener is able to determine the direction in which the particular energy which reaches him was moving when it left the source. Examples of this class of method are found in the following disclosures: An article by Andres Bull, entitled "Fog signaling by polarized sound," on pages 406–407 of the Scientific American, vol. 127, December, 1922; U. S. patent to Blondel, 1,218,237, Mar. 6, 1917, method and apparatus for determining the direction of a Hertzian lighthouse; U. S. patent to Erskine-Murray and Robinson, 1,379,541, May 24, 1921, electromagnetic wave navigational arrangement.

In Fig. 1 is shown a wave transmitting station T, preferably of known location, for sending out an unsymmetrical wave as referred to above. The station T is intended to represent any sending station of the type suitable for use in a direction finding method of the above mentioned second class. Station T will then in general also be capable of use as a sending station in any direction finding method of the first class mentioned above, provided that the station employed for receiving from station T in such method of the first mentioned class is of a type suitable for operation by energy of the form radiated by T. There is also shown a wave receiving station R intended to represent any receiving station which is suitable for operation by the form of energy emitted by T and which is also suitable for use in a direction finding method of the above mentioned first class. Station R will then, in general, also be capable of use as a receiving station in any direction finding method of the second class, provided that the station employed for transmitting to R in that class of method is of a type radiating energy of the form that R is designed to receive.

In the operation of the system comprising the stations T and R according to the present invention, suppose the line P to represent the path of a wave W transmitted from T to R, the path being bent as indicated at B, due for instance to reflection, refraction, absorption or the like effects which cause energy waves such as sound wave or radio waves, for example, to change their direction of propagation. The station R observes the direction I—R in which the wave is incident upon R, by some known method as referred to above, and also observes the direction T—B or E—R in which the wave is emitted from station T, by some known method as mentioned above. The difference between the two observed directions, that is, the angle between E—R and I—R will indicate that the wave has been bent in transmission, for if there had been no such bending the two observations should have given the same direction. The size of angle ERI will indicate the amount that the wave has been bent from the direction in which it was emitted. Moreover, if the angle ERI, that is, the difference between the two observed directions, is not large, there is a strong probability that the true direction of the source lies somewhere within that angle, or in other words, somewhere between the two directions separately given by the two methods of the first and second classes referred to above. Thus, the true direction of T from R in Fig. 1 is the direction RD, lying between ER and IR.

By way of illustration, radiogoniometric apparatus of the type shown in Figs. 2 and 3 of the Blondel patent mentioned above, and, in conjunction therewith, unidirectional radio receiving apparatus of the type shown in Fig. 3 of the Knoll patent mentioned above, may be employed. In the Blondel patent, the use of an ordinary non-directional wireless receiving apparatus is assumed, and the operation of sending and receiving is described as follows: The radiagoniometric transmitter or Hertzian lighthouse sends out a series of signals by means of directed waves distributed in the following manner:

In the northern direction N., the signal 0 (zero), in accordance with the Morse alphabet, that is to say (-----); then by rotating in the direction of the hands of a watch, every three degrees, it will send out a signal $e$ constituted by (.). On arriving in the direction of N. 30° E., it will send out the signal 1, then it will recommence every 3° the signal $e$. In passing through the position N. 60° E., N. 90° E.=east, N. 120° E., N. 150° E. and N. 180° E.=south, it will respectively send out the Morse alphabet signals corresponding to the numbers 2, 3, 4, 5, and 6 and in the intervals, as just explained, every 3° the signal $e$. After having passed through the direction south at 180° the lighthouse will still send out every three degrees the signal $e$ and every 30° a letter H, for instance, which will be the characteristic allotted to the said lighthouse, that is to say, which will make it possible to find out which is the lighthouse from which the signals are being received. It goes without saying that the directed signals can be perceived simultaneously in the two directions of the plane of sending out, comprised on both sides of the lighthouse, and even in a certain sector at either side of the said plane.

Assuming that a receiving station provided with an ordinary wireless telegraphy receiving apparatus, is within the range of action of the lighthouse it will theoretically receive a signal from the lighthouse when the plane of emission cuts it. In practice, it will receive all the signals that may be sent out within its reception sector, a certain angle, always greater than 30° and generally near 45°, equally distributed at either side of the emission plane passing through the receiving station. The angle of 30° has been selected as being that which separates two geographic indications of azimuth of the waves sent out, or two emissions of the characteristic of the lighthouse, and, is, as just explained, smaller than the reception sector of the receiving station. It follows that within the said sector, during one turn of the horizon, the receiving station will receive at least once a geographic indication of azimuth, and at least once the characteristic of the lighthouse during the opposite half-turn of the horizon. By counting the number of signals $e$ received before and after each of the said indications, the ship will be able to determine the geographic azimuth of the two planes which limit its reception sector. By taking the line dividing the said angle, she will locate the position of the Hertzian lighthouse. The location of the position can be made during a single turn of the horizon of the transmitting station, which could last for instance one minute. It goes without saying that the signal conventions hereinbefore given, by way of example, may be modified without departing from the principle of the method which is to signal each of the azimuths of emission.

When the directional receiving apparatus of Fig. 3 of the Knoll patent is employed in conjunction with the transmitting apparatus of the type shown in Figs. 2 and 3 of the Blondel patent, the signal sent out at each 3° between the geographic indications of azimuth is preferably lengthened sufficiently to facilitate the setting of the receiving loop in its angular position which gives maximum strength of the received signal. By so adjusting the receiving loop for each signal received from the transmitting station, and thus noting (with the aid of a compass such for instance as a magnetic or gyroscopic compass) the incidence direction of each signal, (or of each signal arriving near the middle of the time interval during which signals are received in the reception sector of the receiving station), a comparison may be made between the emission and incidence directions of each of the received signals, to detect any material bending of the path of the signal wave between the transmitting station and the receiving station. In particular, the bending may be determined for the path of the signal wave the incidence direction of which most nearly coincides with the plane through the middle of the reception sector of the receiving station.

In the practice of this invention it is, of course, not necessary that the form of energy employed to determine the direction in which the signal wave is incident upon the receiving station be the same as the form employed to determine the direction of emission of the signal wave from the transmitting station.

For instance, the transmitting station may be equipped for emitting both sound waves and radio waves and the receiving station may be equipped for receiving both kinds, the sound waves being used to determine the incidence direction and the radio waves being used to determine the emission direction.

Moreover, in the practice of the invention it is not necessary that the sending apparatus employed to transmit waves used to determine the incidence direction at a receiving station serve also to transmit, or be used also in transmitting, the waves used in ascertaining at the receiving station the emission direction. Similarly, at the receiving station there may be provided, if desired, separate means for receiving the waves used to determine the incidence direction and the waves used to determine the emission direction.

Fig. 2 shows how, in sound signaling, for instance, the accuracy with which the direction of the receiving station from a sending station can be estimated may be increased by making use of the invention, especially if the receiving station is aware of its general location and of the general nature of its surroundings. The transmitting station T' may be, for example, a fog signal located near the mainland as shown. R' is a receiving station, for instance a ship, which desires to know its direction from T'. A high island is shown between T' and R', and opposite this island the coast of the mainland is also high. Consequently, of any sound waves emitted from T', only those passing between the island and the mainland and reflected by the mainland, as indicated by P' in the drawing, can reach R' with sufficient strength or amplitude to produce any pronounced effect upon the sound detecting means at R'. Therefore, the observations made at R' to ascertain the direction of incidence upon R' of waves from T' will, of course, indicate the direction I' R'.

If R' interpreted this indication to mean that the ship lay in the direction I' R' from station T', the ship would be greatly misled as to its direction from T'. Similarly, the observations made at R' to ascertain the direction in which the waves transmitted to R' by T' were traveling when they left T' will, of course, indicate the direction T' I' and if station R' interpreted this indication to mean that the ship lay in the direction T' I' from station T', the ship would be greatly misled as to its direction from T'.

However, in accordance with the invention the receiving station ascertains both the incidence direction and the emission direction of a wave transmitted to R' from T', compares these two observed directions, taking the difference between them as a measure of the bending of the wave during transmission, and, knowing the amount of this bending and the strong probability that the true direction of the source lies somewhere between the direction T' I' and I' R', estimates the direction of the source therebetween as closely as possible by inspection of the topographic map of the region in which the ship is believed to be located.

What is claimed is:

1. In direction finding, emitting directed energy wave signals in a plurality of directions, giving each signal a character which identifies the direction in which it has been emitted, ascertaining at a given point the character of the signal, observing the direction of incidence of the signal upon said point, and determining from the character of the signal and its direction of incidence the approximate position of said given point with respect to the point of wave emission.

2. In a method of direction indication, emitting unsymmetrical signaling energy waves in a plurality of directions, each wave being of such a nature that a listener at a point geographically remote from the wave source is able to determine from the nature of the wave the emission direction of the wave, observing the direction of incidence of the wave, and determining from the nature of the signal and the direction of incidence the approximate position of said remote point relative to the point of wave emission.

3. In direction finding, ascertaining at a signal wave receiving station, geographically remote from and movable relatively to a source adapted to emit a rotating wave beam having different characteristics identifying different directions of emission, the direction of incidence of a wave having one characteristic upon said receiving station, independently ascertaining at said receiving station the direction of emission of said wave, and determining from the direction of incidence of said wave and the direction of its emission the approximate position of said receiving station with respect to said wave source.

4. In finding at a signal wave receiving station, geographically remote from and removable relatively to a source adapted to emit a rotating beam of wave energy having characteristics indicating different directions of propagation, the approximate direction of said receiving station from said source, which comprises ascertaining at said receiving station one of the directions of emission of one of said beams, ascertaining the direction of incidence of said beam upon said receiving station, and using the direction of emission and the direction of incidence at said receiving station to determine the approximate amount of bending of the path of said beam between said source and said receiving station.

In witness whereof, I hereunto subscribe my name this 20th day of August, A. D. 1923.

RALPH V. L. HARTLEY.